Figure 1:
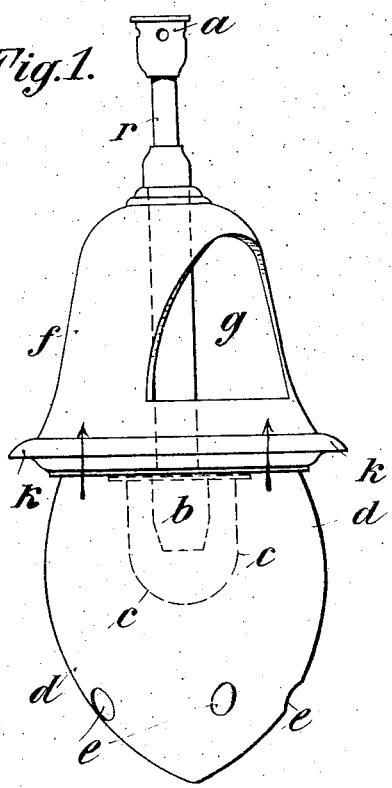

No. 823,309. PATENTED JUNE 12, 1906.
H. SÜSSMANN.
INVERTED INCANDESCENT GAS BURNER.
APPLICATION FILED MAR. 3, 1904.

3 SHEETS—SHEET 1.

WITNESSES:
W. M. Avery
A. H. Davis

INVENTOR
Heinrich Süssmann
BY
ATTORNEYS.

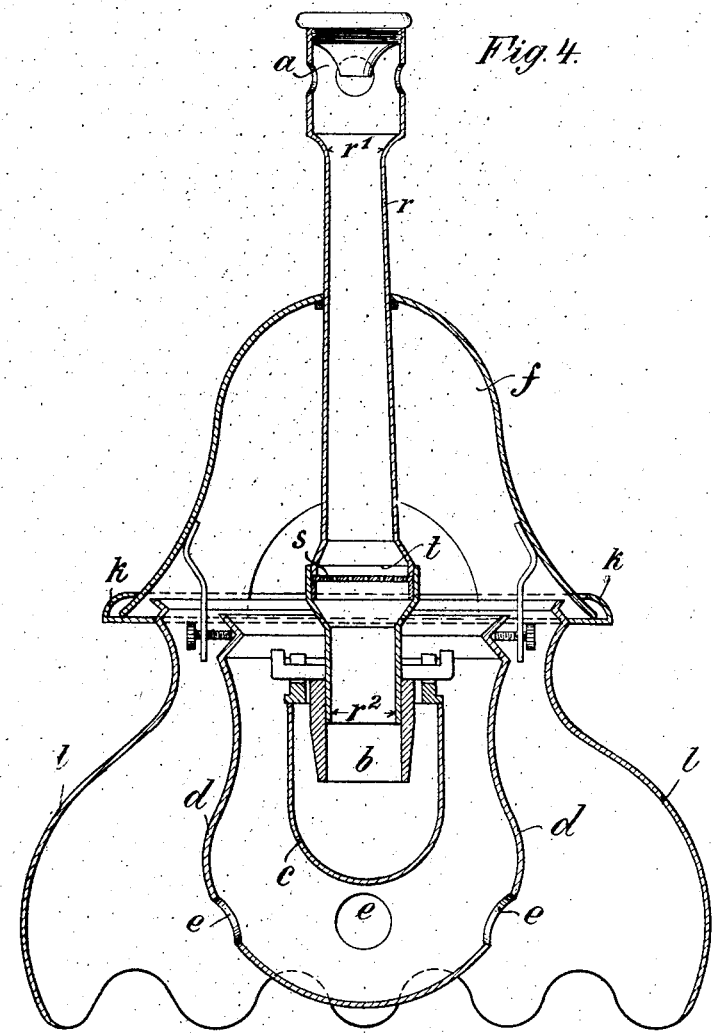

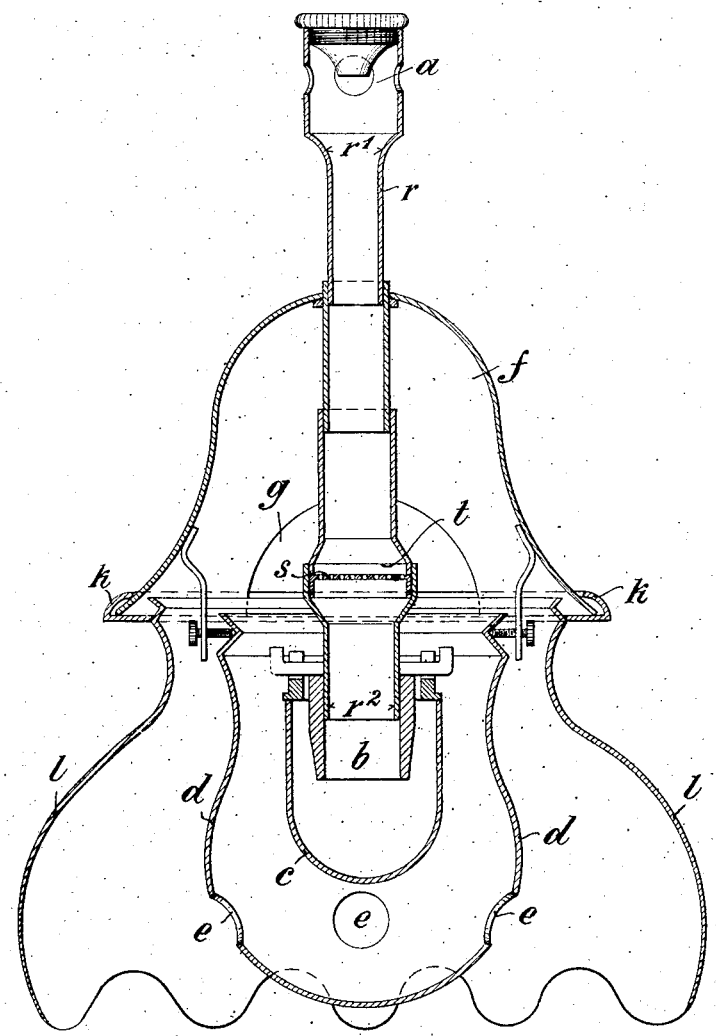

UNITED STATES PATENT OFFICE.

HEINRICH SÜSSMANN, OF BERLIN, GERMANY, ASSIGNOR TO DEUTSCHE GASGLÜHLICHT-AKTIENGESELLSCHAFT, OF BERLIN, GERMANY, A FIRM.

INVERTED INCANDESCENT GAS-BURNER.

No. 823,309.        Specification of Letters Patent.        Patented June 12, 1906.

Application filed March 3, 1904. Serial No. 196,400.

*To all whom it may concern:*

Be it known that I, HEINRICH SÜSSMANN, manager, a subject of the German Emperor, residing at 144 Alte Jacobstrasse, Berlin, in the Empire of Germany, have invented certain new and useful Improvements in Inverted Incandescent Gas-Burners, of which the following is a specification.

For a long time past attempts have been made to improve the method of incandescent gas-lighting in such a manner that the greater part of the light shall not be radiated upward, as it is in the case of incandescent bodies directed vertically upward, this light being only reflected downward by means of screws or shades and with much loss of intensity, but that, as is the case with incandescent electric lighting, the greater part of the light emitted may be downwardly directed, even without the employment of shades or reflectors by the inversion of the burner and its mantle. The products of combustion, which of course pass upward, naturally heat the mixing-tube of the inverted burner highly, so that incomplete combustion and a sooty flame (which latter tends to light back) are produced. Attempts have been made to obviate these defects by preventing the heating of the Bunsen burner as much as possible by the use of insulating substances of various kinds.

The object of the present invention is different, the effect aimed at being only to prevent the influence prejudicial to the efficiency of the burner attendant upon the heating of the mixing-tube, while at the same time utilizing the heat of the waste gases for effecting a preliminary heating of the mixture of gas and air in the Bunsen burner. It was perfectly clear that if the heat of the waste gases could be utilized an increase of the illuminating power would necessarily result. The desired end has been attained in accordance with this invention by giving the mixing-tube a special form based upon the physical reactions which take place in this tube. The rules applicable to the dimensions, width, and length of the mixing-tube for upwardly-directed Bunsen burners may be taken as established. Almost all the burners for inverted lights present a form at variance with these rules. In many cases the mixing-tube is much wider than is required for an upright burner, and toward the outlet-aperture they are mostly narrower or of the same internal diameter. They also vary greatly in length. Now I have found that for inverted incandescent gas-burners the following known form of mixing-tube for upright burners obviates the prejudicial influences of the heat.

The cross-section of the mixing-tube must be normal at the suction-chamber end; but toward the outlet-opening for the mixture of gas and air it should increase in accordance with the heating and consequent increase of volume resulting from the influence of the combustion-gases. This increase of cross-section should be gradual; but in order to facilitate the manufacture of the burner it may take place in gradations without any appreciable detriment to the efficiency of the burner.

In addition to its remarkable economy a further advantage of this novel burner is that it gives a quiet, steady light without smell, while the inverted burners hitherto introduced give an unsteady, flickering light, and owing to incomplete combustion produce an unpleasant smell. The magnitude of the widening cannot be definitely stated in figures for all cases, but is governed by the gas consumption, the kind of gas, and by the heating of the mixing-tube, which is dependent upon this latter and upon the rest of the construction of the burner. It may, however, be readily determined empirically. A widening of the burner-head is also known in inverted incandescent gas-burners; but this is not a characteristic feature of this invention, but an increase in the cross-section of the mixing-tube.

Experiments have shown that the efficiency of this burner is greater if care be taken that the heat generated by the flame is utilized as completely as possible for the heating of the mixing-tube. This increase of efficiency is particularly valuable, on the one hand, because the mixture of gas and air which passes out is more highly heated and, on the other hand, because the widening of the mixing-tube—that is to say, the difference between the normal cross-section of the same at the admission place and its cross-section at the discharge part is greater or because the tube for the mixture of gas and air may be made shorter. In attaining this object an important point is that there is arranged in the burner beneath the air-admission apertures of the mixing-tube and around the mixing-tube a cap, casing, or the like, which device serves for catching the hot gases rising from the flame in such a manner that the mixing-tube is surrounded and also constantly inclosed by the highly-heated waste gases, whereby the heat is more efficiently transmitted thereto. The devices for catching the hot gases also prevent these latter from being conducted to the places at which the suction of the air takes place and so entering the mixing-tube where their action would be prejudicial. The devices for catching the gases are therefore preferably arranged in such a manner that the gases are carried off laterally. The devices may advantageously be arranged beneath the air-suction apertures. The heating power of the flame may also be utilized by conducting a portion of the hot gases with a casing around the burner-tube, while another part of the hot gases is conducted away freely, but in such a manner that they cannot prejudicially affect the operation of the mixing device.

In burners of this class the mixing-tube has hitherto been made as long as possible in order to obviate as far as possible any tendency to lighting back of the flame or its flickering as a result of air or sound waves, and thus obtain a steady flame free from smell. Attempts have been made to enable the mixing-tube to be shortened by inserting in the same a gauze for preventing lighting back or jumping of the flame in the known manner. It has, however, been found that this method acts detrimentally on the efficiency of the burner, because the gauze offers too much resistance to the passage of the gas and air mixture owing to the restriction of the passage, so that this mixture does not issue with sufficient pressure. In accordance with this invention while retaining the dimensioning of the tube in accordance with the volumetric expansion, in the course of the mixing-tube a widening is provided which permits of the provision of a gauze of such magnitude that its free cross-section is not less than the cross-section of the mixing-tube when widened in accordance with the main application, so that therefore the effective cross-section of the mixing-tube is not diminished. Owing to the provision of this gauze, the length of the mixing-tube may be suitably altered or the cross-section may be increased in a measure corresponding with this shortening. It follows from this that the heat generated by the flame may be more efficiently transmitted to the mixing-tube, while at the same time lighting back and flickering of the flame under the influence of air or sound-waves is prevented by the known action of the gauze.

Inverted incandescent gas-burners in accordance with this invention are illustrated in the accompanying drawings, in which—

Figure 2:
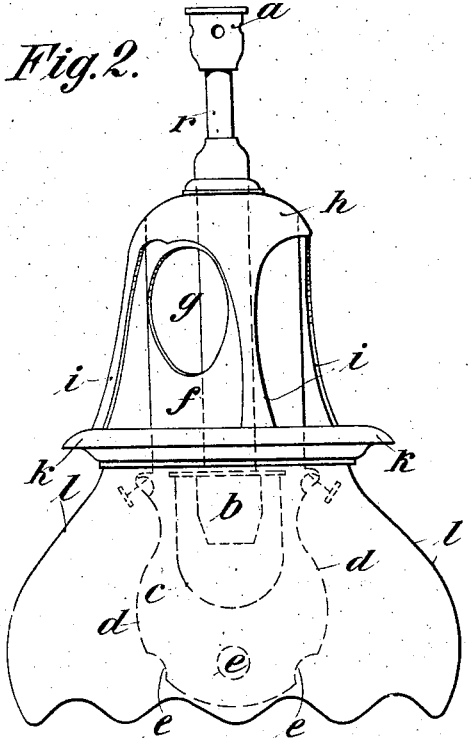
Figure 3:
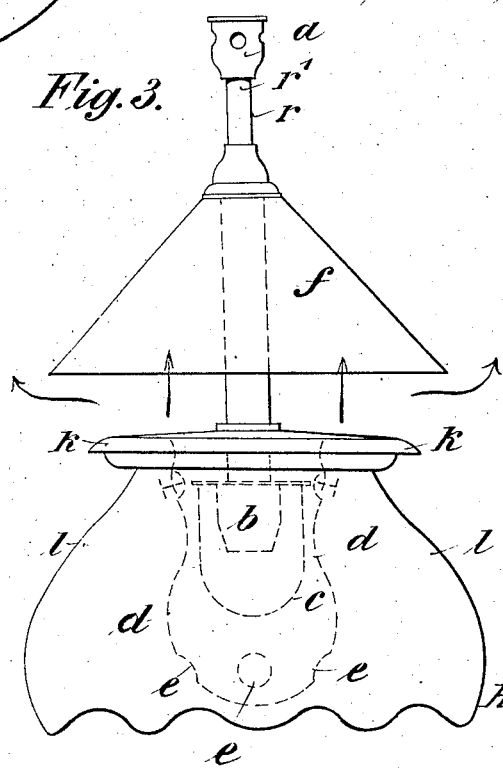

Figures 1, 2, and 3 show three constructional forms for the cap surrounding the mixing-tube. Fig. 4 is a vertical section through the inverted burner and the parts appertaining thereto, showing a gradually-widened mixing-chamber; and Fig. 5 is a similar view showing another embodiment with the same result obtained by widening the mixing-chamber stepwise.

In Fig. 1 the cap is single and is joined to the collar which carries the globe surrounding the incandescing body.

In Fig. 2 the cap which carries a globe is surrounded by a second cap which carries a second globe or shade. In the constructional forms represented in Figs. 1 and 2 the heated air escapes through the cap.

In Fig. 3 the cap itself is attached to the mixing-tube, and between the cap and the globe there is left an interval through which the heated air escapes.

The form of the mixing-tube and the arrangement of the gauze preventing the flame from lighting back into the mixing-tube is shown in Fig. 4.

The mixing-tube $r$ widens out from the width $r'$ to the width $r^2$ either uniformly, as shown in Fig. 4, or by gradations, as shown in Fig. 5. The mixing of gas and air takes place in the mixing-nozzle $a$. The heated mixture of gas and air passes out at $b$. The mixture of gas and air which burns there causes the mantle $c$ or the like to incandesce. The mantle $c$ is protected by the globe $d$, which is provided with openings $e$, through which air is able to enter. This air rises, together with the combustion-air, into the cap $f$, from which either the globe $d$ or a second globe or shade $l$ may be suspended. (See Figs. 1, 2, 4, and 5.) As shown, the globe $d$ is secured in position by screws carried by the cap $f$ and engaging the globe, while the shade $l$ is held to the cap by a collar $k$, formed thereon and with which the margin of the cap engages. In the constructional example shown in Fig. 2 the cap $f$ is surrounded by a second cap $h$, which forms three branches $i$, which carry a collar $k$, on which is a second globe or shade $l$. From the cap $f$ the air escapes through one or more lateral openings $g$, Figs. 1 and 2, or at the lower edge, Fig. 3.

In the constructional form illustrated in Fig. 3 the globes $d\ l$ and the collar $k$ are carried by the mixing-tube of the Bunsen burner or by a casing-tube passed over this mixing-tube. In Fig. 4 the mixing-tube is shown as gradually widening, while in Fig. 5 the widening is stepwise. A widened portion $t$ is formed in the mixing-tube, in which a gauze $s$ for preventing the flame from lighting back is inserted.

In the drawings only a few constructional forms of inverted incandescent gas-burner are shown; but it is of course possible to apply the invention while altering different parts in many ways. Thus the cap, casing, or the like, arranged beneath the openings through which the air is sucked in, may also extend over the air-apertures and surround them annularly in such a manner that these openings extend through the cap or casing. In this case the cap might be open at the upper part in the manner of a chimney. It is also possible to carry the opening for the escape of the hot gases by a laterally-arranged chimney above the air-admission opening for the Bunsen burner. The globes, reflectors, or the like may of course be fixed in place in any convenient manner. If the mixing-tube is widened out in steps, the number of such steps may vary, as desired. The gauze for preventing the flame from lighting back may be either single or multiple. In the latter case it is immaterial whether several gauzes are arranged in one widening or whether a separate widening is provided for each gauze. In any case the object is to utilize the heat produced by the flame for increasing the illuminating power in inverted gas-burners in such a manner that a part of this heat is conducted to the gas mixture in the mixing-tube, this latter being given such a form that no resistance to the passage of the gas mixture may result from the increase of volume due to the heat supplied.

I claim—

1. In an inverted or downwardly-burning incandescent gas-burner, a mixing-tube increasing in diameter in direction from its upper to its lower end, and having an enlargement near its lower end, a gauze in the enlargement of the mixing-tube, a mantle on the lower end of the tube, a cap secured to the tube and extending downwardly around the same, and a globe or globes carried by the cap and surrounding the mantle.

2. In an inverted or downwardly-burning incandescent gas-burner, a mixing-tube increasing in diameter in direction from its upper to its lower end and having an enlargement, a gauze in the enlargement of the tube, a mantle on the lower end of said tube, and a cap secured to the tube and extending downwardly around the same.

3. In an inverted or downwardly-burning incandescent gas-burner, a mixing-tube increasing in diameter in direction from its upper to its lower end, and a cap mounted upon the tube and extending downwardly around the same, whereby the heated gases from the burner will be caused to circulate around the mixing-tube.

4. In an inverted or downwardly-burning incandescent gas-burner, a mixing-tube increasing in diameter in direction from its upper to its lower end, as and for the purpose set forth.

In testimony whereof I have hereunto set my hand, in presence of two subscribing witnesses, this 17th day of February, 1904.

HEINRICH SÜSSMANN.

Witnesses:
HENRY HASPER,
WOLDEMAR HAUPT.